United States Patent
LaCous

(10) Patent No.: US 7,502,938 B2
(45) Date of Patent: Mar. 10, 2009

(54) TRUSTED BIOMETRIC DEVICE

(75) Inventor: Mira LaCous, Eagan, MN (US)

(73) Assignee: BIO-key International, Inc., Eagan, MN (US)

( * ) Notice: Subject to any disclaimer, the term of this patent is extended or adjusted under 35 U.S.C. 154(b) by 824 days.

(21) Appl. No.: 10/626,185

(22) Filed: Jul. 24, 2003

(65) Prior Publication Data

US 2004/0128520 A1    Jul. 1, 2004

Related U.S. Application Data

(60) Provisional application No. 60/398,419, filed on Jul. 25, 2002.

(51) Int. Cl.
*H04K 1/00* (2006.01)
*G06F 7/04* (2006.01)

(52) U.S. Cl. .................. 713/186; 726/27; 726/16

(58) Field of Classification Search .............. 713/186; 726/16, 24
See application file for complete search history.

(56) References Cited

U.S. PATENT DOCUMENTS

| | | | | |
|---|---|---|---|---|
| 5,117,358 | A | | 5/1992 | Winkler .................. 708/135 |
| 5,799,086 | A | | 8/1998 | Sudia ..................... 705/76 |
| 5,815,577 | A | | 9/1998 | Clark ..................... 380/52 |
| 5,825,880 | A | | 10/1998 | Sudia et al. .............. 713/280 |
| 5,838,812 | A | * | 11/1998 | Pare et al. ................ 382/115 |
| 5,841,868 | A | | 11/1998 | Helbig, Sr. .............. 235/380 |
| 5,870,723 | A | * | 2/1999 | Pare et al. ................ 705/39 |
| 5,926,550 | A | | 7/1999 | Davis ..................... 713/176 |
| 6,092,202 | A | | 7/2000 | Veil et al. ................. 713/201 |
| 6,134,662 | A | * | 10/2000 | Levy et al. ............... 726/11 |
| 6,167,517 | A | * | 12/2000 | Gilchrist et al. .......... 713/186 |
| 6,182,076 | B1 | | 1/2001 | Yu et al. .................. 707/10 |
| 6,202,151 | B1 | * | 3/2001 | Musgrave et al. ......... 713/186 |
| 6,212,633 | B1 | * | 4/2001 | Levy et al. ............... 713/153 |
| 6,246,376 | B1 | | 6/2001 | Bork et al. ............... 343/760 |
| 6,256,737 | B1 | * | 7/2001 | Bianco et al. ............ 713/186 |
| 6,263,438 | B1 | | 7/2001 | Walker et al. ............ 713/178 |
| 6,307,956 | B1 | | 10/2001 | Black ..................... 382/124 |
| 6,311,272 | B1 | * | 10/2001 | Gressel .................. 713/186 |
| 6,405,922 | B1 | | 6/2002 | Kroll ..................... 235/379 |

(Continued)

FOREIGN PATENT DOCUMENTS

WO    WO 01/27723 A1    4/2001

OTHER PUBLICATIONS

PCT—International Search Report.

(Continued)

*Primary Examiner*—Emmanuel L Moise
*Assistant Examiner*—Techane J Gergiso
(74) *Attorney, Agent, or Firm*—Westman, Champlin & Kelly, P.A.

(57) ABSTRACT

A computer-implemented method for enhancing the security of informational interactions with a biometric device is disclosed. The method includes pre-establishing an encryption relationship between a computing device and the biometric device. An instruction is received to begin an authorization or enrollment session. A session packet is generated and encrypted. The session packet is transmitted to the biometric device. A biometric information packet is received and decrypted. A determination is made, based on a content of the decrypted biometric information packet, as to whether or not to utilize a collection of biometric data contained in the decrypted biometric information packet.

35 Claims, 9 Drawing Sheets

U.S. PATENT DOCUMENTS

| | | | |
|---|---|---|---|
| 6,411,716 B1 | 6/2002 | Brickell | 380/286 |
| 6,418,472 B1 | 7/2002 | Mi et al. | 709/229 |
| 6,694,025 B1* | 2/2004 | Epstein et al. | 380/279 |
| 6,920,561 B1* | 7/2005 | Gould et al. | 713/186 |
| 6,925,182 B1* | 8/2005 | Epstein | 380/277 |
| 7,024,562 B1* | 4/2006 | Flink et al. | 713/186 |
| 7,028,191 B2* | 4/2006 | Michener et al. | 713/182 |
| 7,107,348 B2* | 9/2006 | Shimada et al. | 709/229 |
| 7,107,620 B2* | 9/2006 | Haverinen et al. | 726/29 |
| 7,188,110 B1* | 3/2007 | Ludtke et al. | 707/10 |
| 2001/0040987 A1 | 11/2001 | Bjorn et al. | |
| 2001/0048359 A1* | 12/2001 | Yamane et al. | 340/5.53 |
| 2001/0050990 A1 | 12/2001 | Sudia | 380/283 |
| 2002/0023032 A1 | 2/2002 | Pearson et al. | 713/202 |
| 2002/0023212 A1 | 2/2002 | Proudler | 713/164 |
| 2002/0026584 A1 | 2/2002 | Skubic et al. | 713/180 |
| 2002/0076054 A1* | 6/2002 | Fukutomi et al. | 380/277 |
| 2002/0081972 A1 | 6/2002 | Rankin | 455/41.2 |
| 2002/0095587 A1 | 7/2002 | Doyle et al. | 713/186 |
| 2002/0112183 A1 | 8/2002 | Baird et al. | 713/201 |
| 2002/0122055 A1 | 9/2002 | Parupudi et al. | 343/737 |
| 2002/0159596 A1 | 10/2002 | Durand et al. | 380/255 |
| 2002/0166072 A1 | 11/2002 | Cromer et al. | 713/202 |
| 2002/0174344 A1* | 11/2002 | Ting | 713/185 |
| 2002/0174345 A1* | 11/2002 | Patel | 713/186 |
| 2003/0101346 A1* | 5/2003 | Barron et al. | 713/175 |
| 2003/0105966 A1* | 6/2003 | Pu et al. | 713/186 |
| 2003/0208684 A1* | 11/2003 | Camacho et al. | 713/186 |
| 2004/0128520 A1* | 7/2004 | LaCous | 713/186 |

OTHER PUBLICATIONS

Menezes et al.; "Handbook of Applied Crytography Key Establishment Protocols," Hand of Applied Crytography, Boca Ranton FL CRC Press, USA—Jan. 1997—pp. 489-541.

* cited by examiner

TRUSTED BIOMETRIC DEVICE

REFERENCE TO RELATED CASE

This application claims priority from U.S. Provisional Application Ser. No. 60/398,419 filed on Jul. 25, 2002, and entitled "TRUSTED BIOMETRIC DEVICE."

BACKGROUND OF THE INVENTION

The present invention generally pertains to biometric security systems. More specifically, the present invention pertains to biometric security systems that provide an enhanced defense against unlawful hackers and other system attackers.

Within a typical biometric security system, there are at least two operations, enrollment and authentication. The operation of enrollment encompasses the original sampling of a person's biometric information, and the creation and storage of a match template (a.k.a., an enrollment template) that is a data representation of the original sampling. The operation of authentication includes an invocation of a biometric sample for the identification or verification of a system user through comparison of a data representation of the biometric sample with one or more stored match templates.

Biometric information is, by nature, reasonably public knowledge. A person's biometric data is often casually left behind or is easily seen and captured. This is true for all forms of biometric data including, but not limited to, fingerprints, iris features, facial features, and voice information. As an example, consider two friends meeting. The one friend recognizes the other by their face and other visible key characteristics. That information is public knowledge. However, a photo of that same person 'is' not that person. This issue similarly applies, electronically, to computer-based biometric authentication wherein a copy of authorized biometric information is susceptible to being submitted as a representation of the corresponding original information. In the context of biometric security applications, what is important, what enables a secure authentication, is a unique and trusted invocation of an authorized biometric.

A key issue confronting biometric authentication for security applications is providing some sort of assurance that the biometric sample being processed is a true and trusted sample. Numerous known biometric security systems are susceptible to being duped because a data representation received by a security processor is actually a fraudulent invocation of biometric information. For example, an individual in possession of a copy of authorized biometric information can submit the copy to enable unauthorized access. In a particularly dangerous scenario, an individual in possession of an electronic copy of authorized biometric information can fraudulently bypass the physical collection of biometric information and directly submit the copy to an electronic security processor to enable unauthorized access.

To ensure a trusted invocation of biometric information, the integrity of any transfers of information between a capture device and a processor should be maintained. In particular, the processor responsible for receiving and processing biometric information submitted by a user should be able to 'trust' the biometric data it receives. In other words, there should be a trusted relationship between a device that gathers a user's biometric information (i.e., a fingerprint scanner) and a security processor responsible for processing that biometric information.

Ensuring that access is granted only upon unique and trusted invocations of authorized biometric information is a challenge relevant to most biometric security systems.

SUMMARY OF THE INVENTION

Figure 1:
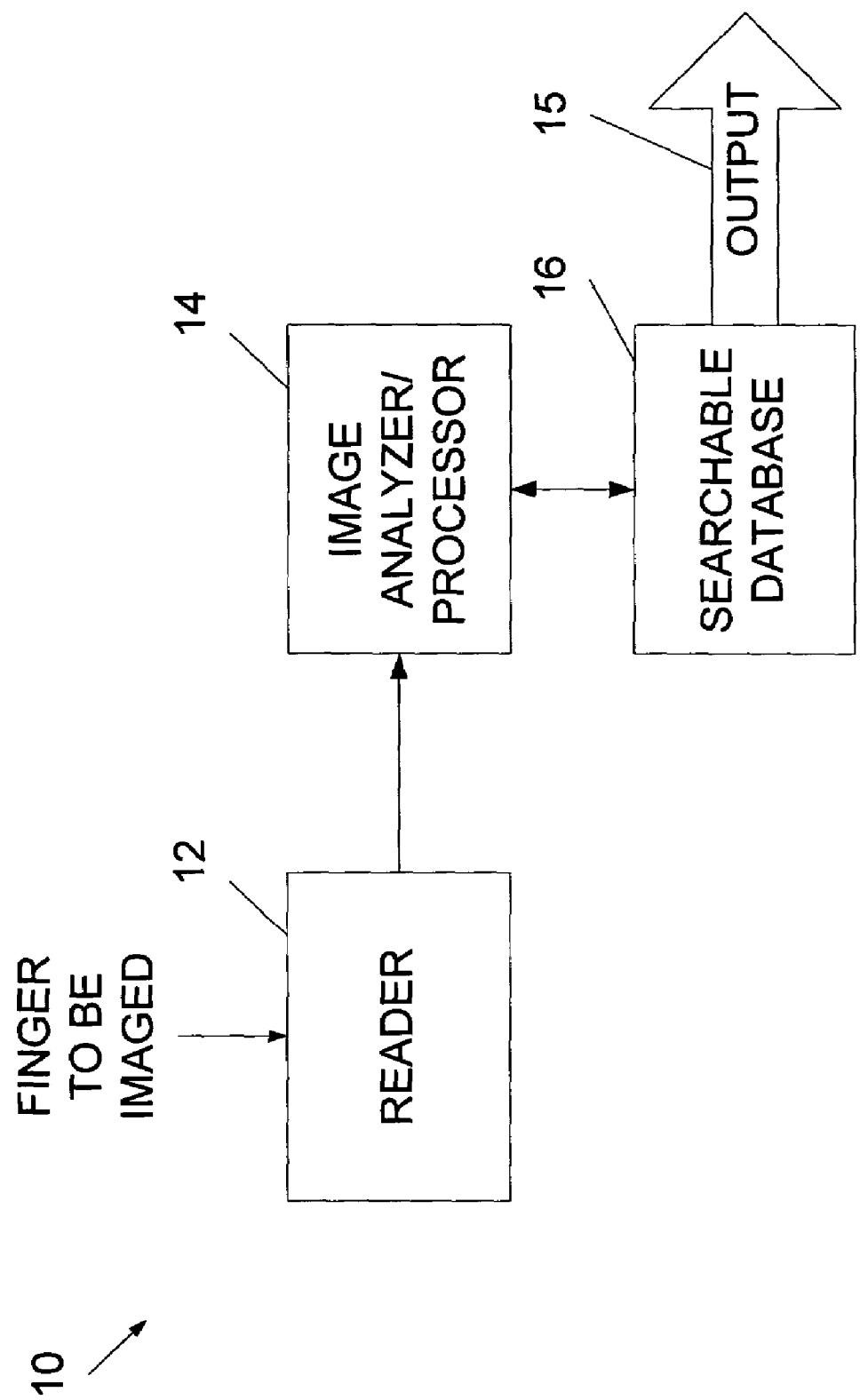
FIG. 1 is a block diagram of a user authentication system.

Embodiments of the present invention pertain to a computer-implemented method for enhancing the security of informational interactions with a biometric device. The method includes pre-establishing an encryption relationship between a computing device and the biometric device. An instruction is received to begin an authorization or enrollment session. A session packet is generated and encrypted. The session packet is transmitted to the biometric device. A biometric information packet is received and decrypted. A determination is made, based on a content of the decrypted biometric information packet, as to whether or not to utilize a collection of biometric data contained in the decrypted biometric information packet.

DETAILED DESCRIPTION OF ILLUSTRATIVE EMBODIMENTS

I. Illustrative Contextual Environments

Various aspects of the present invention pertain to biometric security systems that provide an enhanced defense against unlawful hackers and other system attackers. The concepts of the present invention are designed to operate in conjunction with a broad range of general security applications, including but not limited to physical access security applications, computer network security applications, individual computer security applications, Internet based applications and systems, as well as other security applications. The methods and systems of the present invention are also generally suitable for improving the performance and reliability of user authentication systems.

Embodiments of the present invention can be implemented to restrict access to secure data. Embodiments can also or alternatively be implemented to enhance security provided in association with a variety of access points. Some of these access points are associated with a physical space, such as a building, a room, a particular airport terminal, an airplane, etc. In accordance with one embodiment, a biometric scanner is physically positioned within an unsecured area, while access to a separated secured area is denied to anyone who is unable to present authorized biometric information to a biometric scanner for processing by an associated access control program. In accordance with another embodiment, a biometric scanner is physically positioned on an unsecured side of a locked door that remains locked until authorized biometric information is received by a biometric scanner and adequately processed by an associated access control program.

Embodiments of the present invention can also be implemented to enhance security provided in association with electronic access points. Through interaction with a computing device, a user is able to encounter a wide variety of functional and informational access points or transaction access points, most all of which can potentially be secured with the systems and methods of the present invention.

A potentially securable electronic access point is encountered when a user is presented with an ability to gain general access to a particular computer network (e.g., a particular LAN, the Internet, etc.). Another potentially securable electronic access point is encountered when a user is presented with an ability to access a particular collection of information (e.g., medical records, account information, personnel information, protected data files, etc.) that is stored on the computing device with which the user is interacting, or is accessibly stored on a remote computing device. Another potentially securable electronic access point is encountered when a user is presented with an ability to access and operate a particular program that is stored on the computing device with which the user is interacting, or is accessibly stored on a remote computing device. Still other potentially securable electronic access points are encountered when a user is presented with an ability to access information stored within a particular file or directory, or an ability to access a class of information that is identified in a particular manner (e.g., confidential), or an ability to utilize functions associated with another independent device (e.g., a particular camera, scanner, cash drawer, vault, etc). These are only a few of many electronic access points that could be secured utilizing the systems and methods of the present invention.

The present invention is useful with various types of biometric technology. Specific technologies include iris or retina eye-scan technology, voice technology, face technology, hand geometry technology, DNA technology, spectral biometric technology and fingerprint technology, for example. To the extent that the present description describes a fingerprint-based system, such description is intended to be but one example of a suitable system. The scope of the present invention is not so limited.

II. Illustrative Operational Environment

FIG. 1 is a block diagram of a user authentication system 10. User authentication system 10 includes a reader portion 12, image analyzer/processor 14 and searchable database 16, which further includes an output 15. Reader portion 12 can be any of a number of known systems capable of scanning an image of a fingerprint and transferring data pertaining to the image to an image analyzer, such as image analyzer/processor 14.

In many cases, reader portion 12 will include an optical or electronic device that includes a platen designed to receive the finger to be imaged. A digitized image of biometric information is produced. The reader commonly uses light or electricity to image the finger's pattern. The digitized image is transferred out of reader portion 12 to image analyzer/processor 14. Image analyzer/processor 14 varies with application, but generally analyzes the image data received for a wide variety of purposes and applications.

Image analyzer/processor 14 is illustratively configured to create an authentication model (a.k.a., image model) based on the particular features and characteristics of images received from reader portion 12. In accordance with one embodiment, authentication models are more than facsimiles of their associated fingerprint images and include a unique range of data elements that provide various analytical opportunities. Authentication model creation is described in U.S. patent application Ser. No. 09/991,589, filed on Nov. 16, 2001, entitled IMAGE IDENTIFICATION SYSTEM, which is owned by the present Applicant, and the contents of which are hereby incorporated by reference in their entirety.

In one embodiment, image analyzer/processor 14 directly or indirectly compares data elements of a generated authentication model to data elements of at least one other authentication model stored within searchable database 16. The authentication models stored in database 16 illustratively correspond to previously obtained scanned images, while the authentication model being compared illustratively corresponds to a contemporaneously scanned image. User authentication system 10 is configured to efficiently make a determination as to whether the authentication model corresponding to the contemporaneously scanned fingerprint is substantially similar to any of the authentication models (or directly related data collections) included within the searchable database 16. In this manner, user authentication system 10 provides an efficient and accurate fingerprint image identification system. Such a system is used, for instance, as a security measure to determine whether the person who places a finger on the reader portion 12 should be authorized to enter a room, to access a bank account or to take any other variety of actions.

As is shown in FIG. 1, searchable database 16 includes an output 15. The precise nature of output 15 depends on the context within which user authentication system 10 is to be applied. For instance, output 15 could be a positive or negative match indication, or an identification indicator of an authentication model or data collection contained in searchable database 16 that substantially matches or corresponds to the image scanned by reader portion 12. These are but several examples of the many potential forms of output 15. In addition, output 15 can include data to be communicated to an application.

III. Operational Overview

Figure 2:
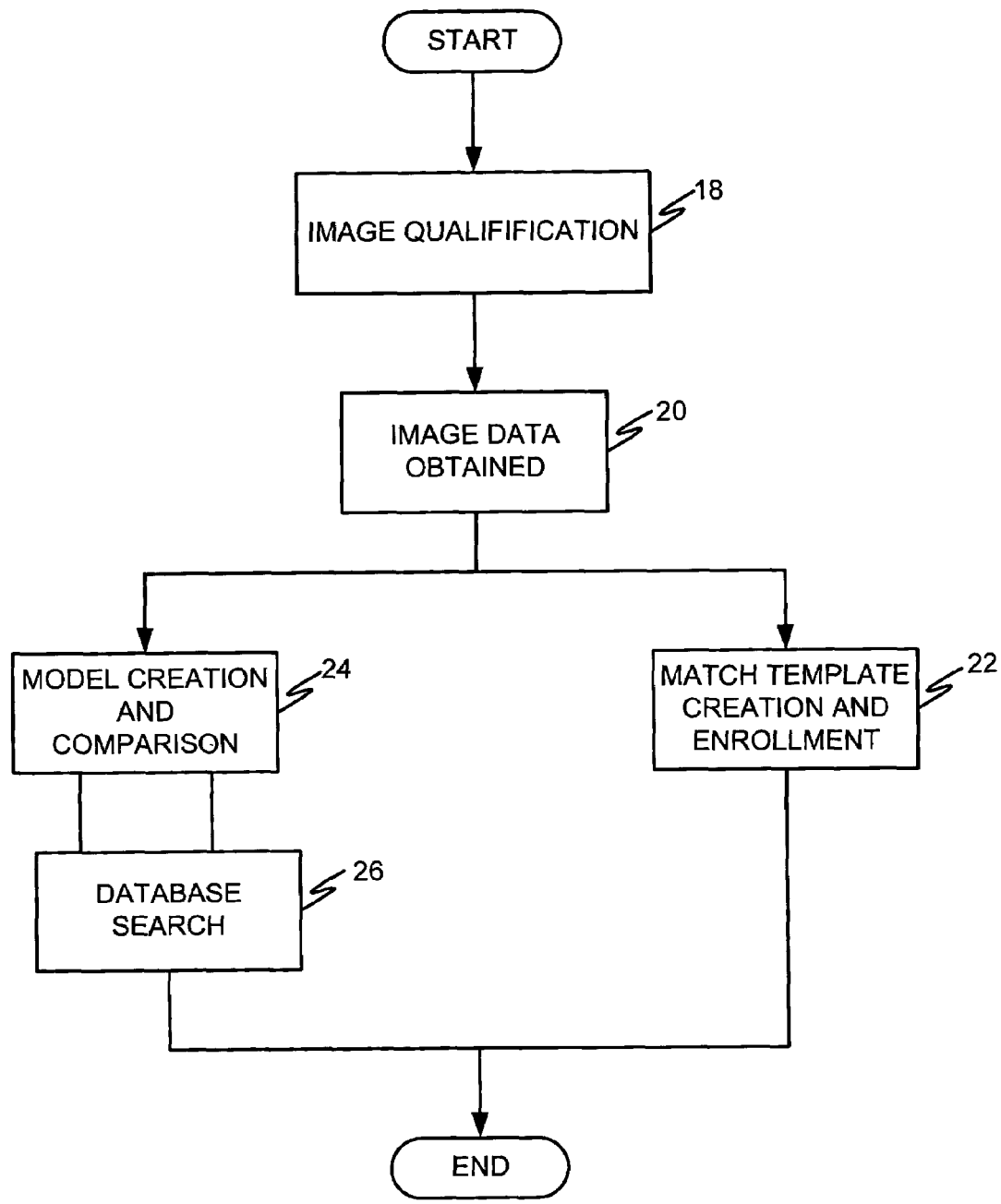
FIG. 2 is a flow diagram illustrating operations performed in association with the user authentication system.

FIG. 2 is a flow diagram illustrating operations to be carried out within system 10, for example within analyzer/processor 14, in accordance with an embodiment of the present invention. The process begins when image analyzer/processor 14 receives image data from reader portion 12. After receiving image data, image analyzer/processor 14 illustratively first performs, as is indicated by block 18 in FIG. 2, a series of image qualification functions. The image qualification functions are illustratively optional.

Briefly, image qualification 18 involves quickly processing all or part of the available image data to ensure that the received image is a scan of a real fingerprint (as opposed to a fraudulent fingerprint) and of sufficient quality to proceed with processing. In one embodiment, if the image qualification process leads to the conclusion that the scanned image is fraudulent or of insufficient quality, then processing of the image is interrupted. In such a case, the system user is provided with feedback pertaining to identified inadequacies and is allowed to continue processing only when the inadequacies have been corrected.

In accordance with one aspect of the present invention, image qualification 18 can include means for providing assurance that reader 12 is a trusted biometric device, and that received images are not somehow fraudulent. This aspect of the present invention will be described below in detail in relation to FIGS. 3-9.

Block 20 in FIG. 2 represents the point at which qualified image data has been obtained. After qualified image data has been obtained, the image data is utilized for at least one of two purposes, namely, enrollment and authentication. Block 22 represents the enrollment process during which match templates are generated (i.e., based on digitized qualified image data) and entered into, and illustratively catalogued within, searchable database 16. Block 24 represents the authentication process that includes comparing data associated with an invocation of biometric data with stored data for the purpose of determining whether access should be granted or denied.

In accordance with one embodiment, data representations generated during processes 22 and 24 are generated in accordance with the same algorithm, or two substantially similar algorithms, such that they are produced in the same, or a substantially similar, format. In accordance with one embodiment; however, substantially different but related algorithms are utilized. Accordingly, the generated data representations are related but not identical. This enables an indirect, relationship-based comparison process during authentication. This indirect comparison process is the subject of a copending application that is owned by the present Applicant.

As is indicated by block 26 in FIG. 2, a database search 26 can be performed in association with model comparison 24 to determine which, if any, of multiple match templates stored in the searchable database adequately match a data representation generated during the authentication of a "live" invocation. Illustratively, database search 26 is a quick and efficient determination as to which, if any, of potentially thousands, or even millions, of enrollment templates (or data collections related thereto) within database 16 exhibit a desired level of similarity, as compared to a target representation of a "live" invocation. Searching can be done by biometric information alone, or by some identifier like employee ID, User ID, account number, etc. In accordance with one embodiment, an identifier (i.e., an employee ID, User ID, account number, etc.) is utilized to select a single collection of data from database 16 to be compared to a target representation of a "live" invocation on a one-to-one basis.

In accordance with one embodiment, a set of database keys that describe different match template characteristics are defined to facilitate general rather than specific comparisons to be made during the database search 26 process.

IV. Trusted Biometric Device Methods and Systems

The foundation behind the described security environments and applications lies in an ability to obtain a unique and trusted invocation of a user's biometric data. Accordingly, the process of gathering a user's biometric information and transferring it for processing should be protected, trusted and secured. A transferred collection of biometric data should be worthy of being trusted as a true representation of a user's newly presented biometric information (i.e., a "live" invocation). The analyzer/processor should be able to 'trust' the biometric data it receives. Preventing a replay (i.e., electronic replay) of biometric data is paramount.

Figure 3:
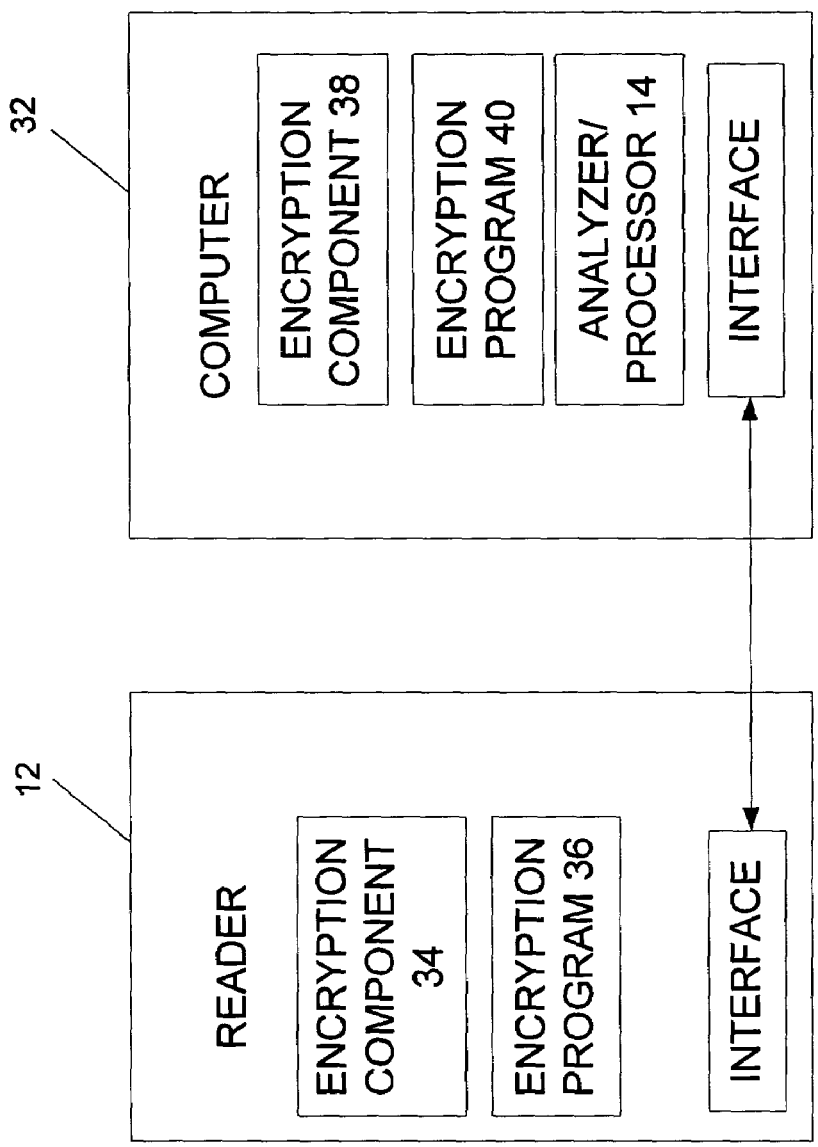
FIG. 3 is a schematic block diagram illustrating one example of an environment within which embodiments of the present invention can be implemented.

In accordance with one aspect of the present invention, FIG. 3 illustrates a general block diagram of an environment within which image qualification may be implemented to add assurance that reader 12 (FIG. 1) is a trusted biometric device, and that received images are not somehow fraudulent. Image analyzer/processor 14 (FIG. 1) is implemented on a computer 32. As was described in relation to FIG. 1, reader 12 is configured to receive biometric information from a system operator and transfer corresponding information to analyzer/processor 14 for authentication, enrollment, etc.

An encryption component 34 and an encryption program 36 are illustratively operably stored with reader 12. In accordance with one embodiment, encryption program 36 is implemented as device firmware. In accordance with another embodiment, encryption program 36 is executed in association with a flash memory implementation. An encryption component 38 and an encryption program 40 are illustratively operably stored with computer 32. In accordance with one embodiment, encryption program 40 is implemented as software. Encryption component 34 and encryption component 38 are illustratively related encryption values (e.g., each component is one portion of a related PKI encryption key pair).

Figure 4:
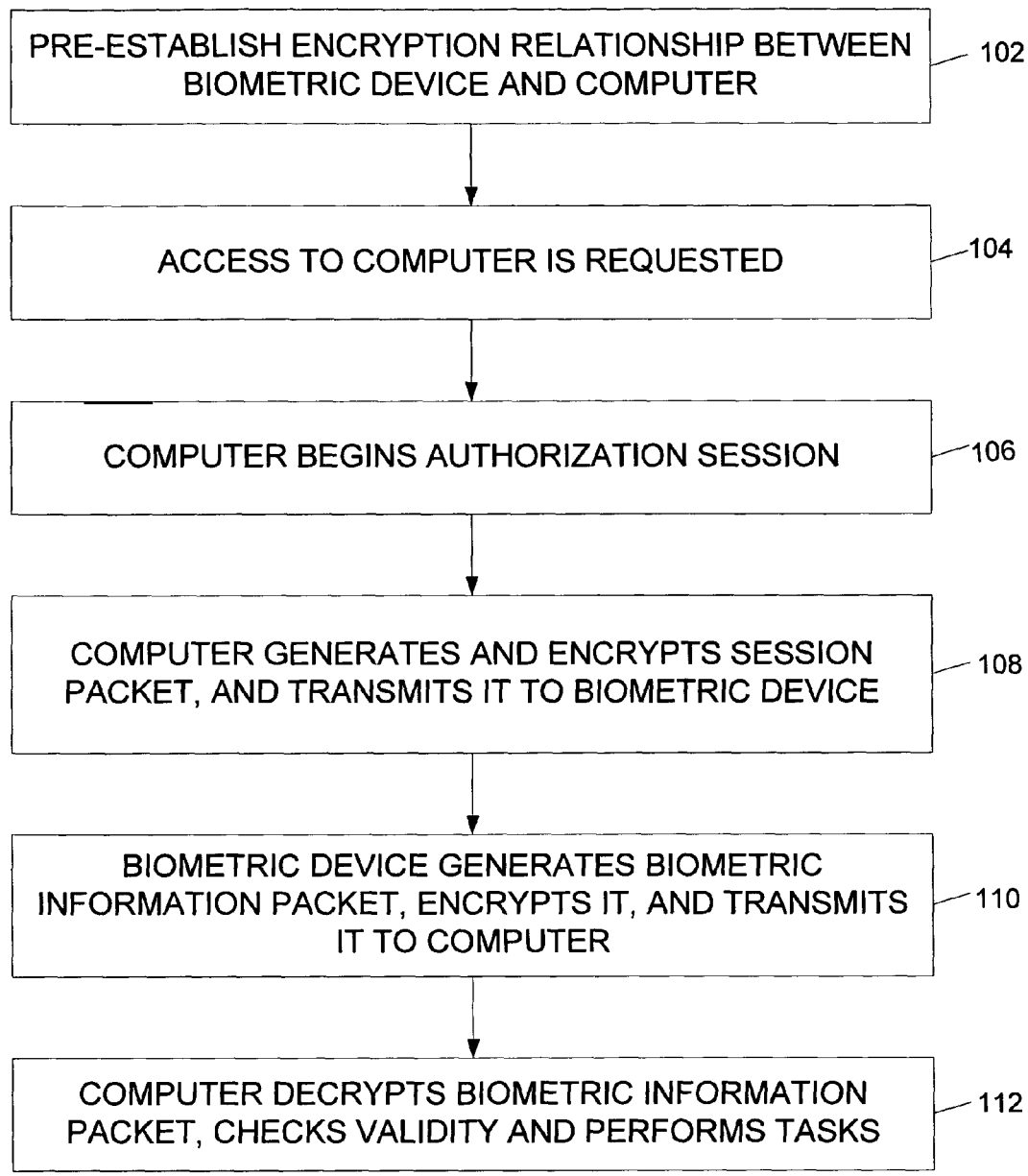
FIG. 4 is a flow diagram illustrating steps associated with a method for enabling trusted communication between a biometric device and a computer.

FIG. 4, in accordance with one aspect of the present invention, illustrates a method that is generally applicable within the environment discussed in relation to FIG. 3.

Initially, as is indicated at step 102, an encryption relationship is pre-established between reader 12 and computer 32. In one mode of operation, each of the reader 12 and the computer 32 includes a separate but related encryption component. For example, as is illustrated, reader 12 has encryption component 34 and computer 32 has encryption component 38. Encryption component 34 is directly affiliated with the encryption component 38 (e.g., one of the encryption components is utilized to decrypt information that has previously been encrypted utilizing the other encryption component). In accordance with one embodiment, encryption component 34 is a first part of a PKI key pair and encryption component 38 is a second part of the key pair. One of the first and second parts of the PKI key pair is illustratively a private encryption key and the other is illustratively a corresponding public encryption key. Related encryption component pairs other than a PKI pair (e.g., a predetermined related static key pair) could be utilized without departing from the scope of the present invention.

After an encryption relationship has been pre-established between reader 12 and computer 32, the next step, in accordance with step 104, is for reader 12 to request access from computer 32. It should be noted that the request need not come directly from the biometric device. The request can actually come from an independent application associated with the biometric device (i.e., an independent software application), or from an independent device associated with the biometric device. In accordance with one embodiment, the request corresponds to a command or similar interaction initiated by a system operator. Once access has been requested, assuming that the requested access involves restricted or secured rights, the computer 32 initiates an authorization session at step 106. Illustratively, an authorization session opens upon initiation and closes after a predetermined time period. The predetermined time period is illustratively chosen to be about as long, with whatever lead or support time is required, as it takes to complete a scan or reading of a system operator's biometric information. Thus, if the system operator delays too long in performing the biometric read, the read is not accepted. It should be noted that the security processes of the present invention are not limited to the authentication process. Similar steps could just as easily be carried out in association with an enrollment or some other process that would benefit from secure computing device—biometric device interaction.

At step 108, the computer 32 generates a session packet (e.g., computer 32 responds to software instructions). A session packet illustratively includes two items. A first included item is a session number, which is a unique, illustratively non-consecutive, number that is created for each session packet. A session packet is created for each initiated session. A session is initiated for each request for access to a secured item. A second item included in a session packet is one portion of a PKI key pair, illustratively a public key portion.

After the session packet has been generated, it is encrypted utilizing the pre-established encryption component associated with computer 32. The encrypted session packet is then transmitted to reader 12. A copy of the session number is illustratively retained with the computer 32. A private key is also retained. The private key illustratively corresponds to the public key that is encryptically stored within the session packet.

During step 110, reader 12 generates a biometric information packet. To accomplish this, reader 12 utilizes the encryption component 34 to decrypt the session packet. Accordingly, reader 12 then has access to the public key stored in the session packet. Reader 12 then collects biometric information from a system operator. The collected biometric information and the session number illustratively comprise at least two parts of a biometric information packet. The biometric information packet is encrypted utilizing the public key that was transferred to reader 12 within the session packet.

The encrypted biometric information packet is transmitted to the computer 32. There, the retained private key is utilized to decrypt the biometric information packet, which was encrypted with a corresponding public key (the public key sent previously within the session packet). As is indicated at step 112, the retained session number is compared to the received session number to be sure that the two values match. A check is made to be sure that the received session number was received within a proper predetermined time frame (e.g., as measured from the moment the session number was created). If the session number does not match or was not received in time, then the biometric information is not utilized for any subsequent purpose (i.e., authentication, enrollment, etc.) Assuming the session numbers do match and timing is adequate, the system operator's biometric information can then be transferred to analyzer/processor 14 for processing (i.e., for authentication, enrollment, etc.)

Figure 5:
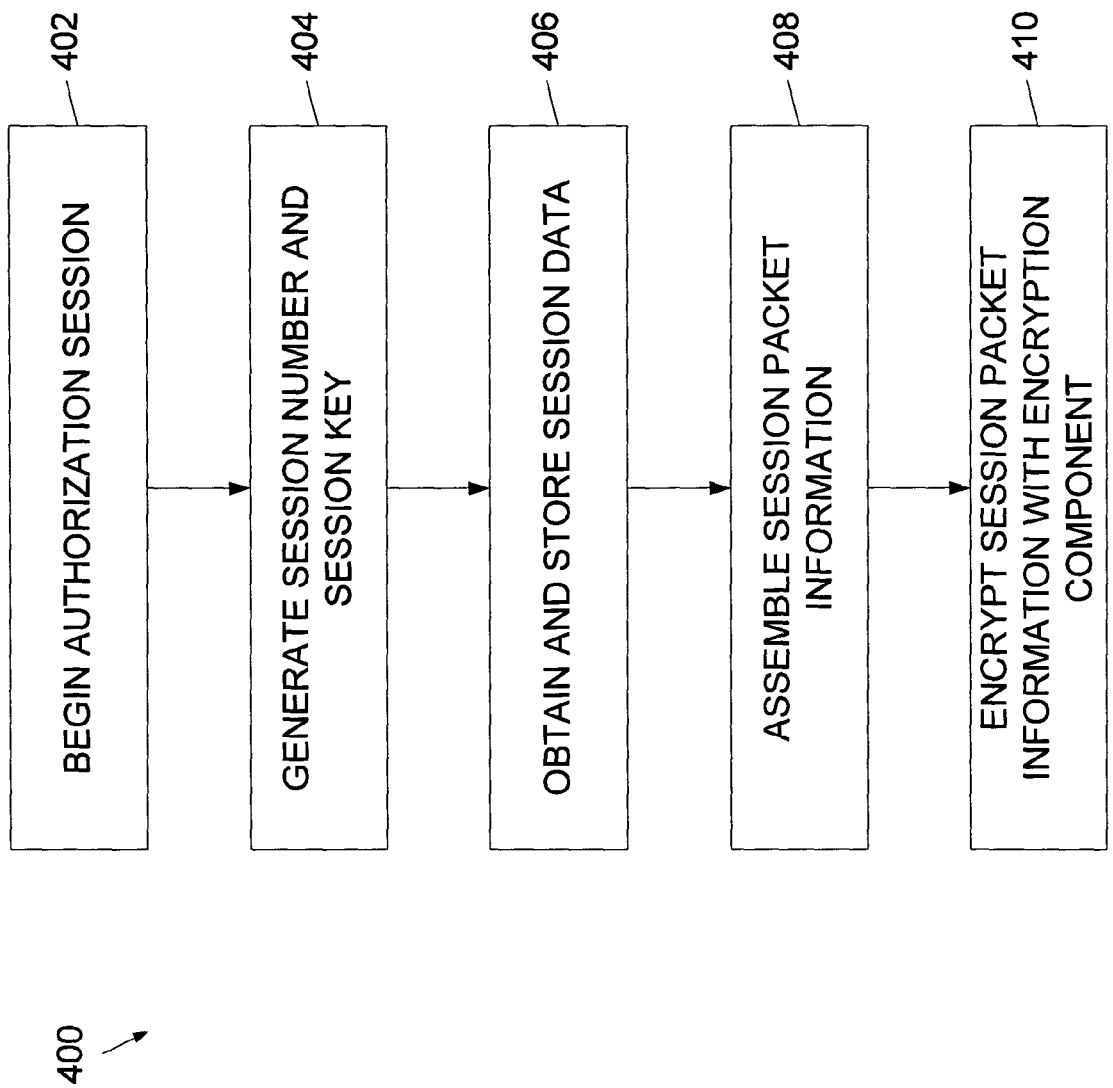
FIG. 5 is a flow diagram illustrating steps associated with generating a session packet.

In accordance with the present invention, computer 32 generates a session packet according to method 400 illustrated in FIG. 5. At step 402, computer 32 initiates an authorization session. Next, a session number and session key (a public key) is generated at step 404. At step 406, session data (e.g., the session number and a time stamp) is stored. A private key that corresponds to the public session key is stored for later decryption of data sent from reader 12. Session packet information is assembled at step 408. Next, at step 410, the session packet information is encrypted using encryption component 38.

Figure 6:
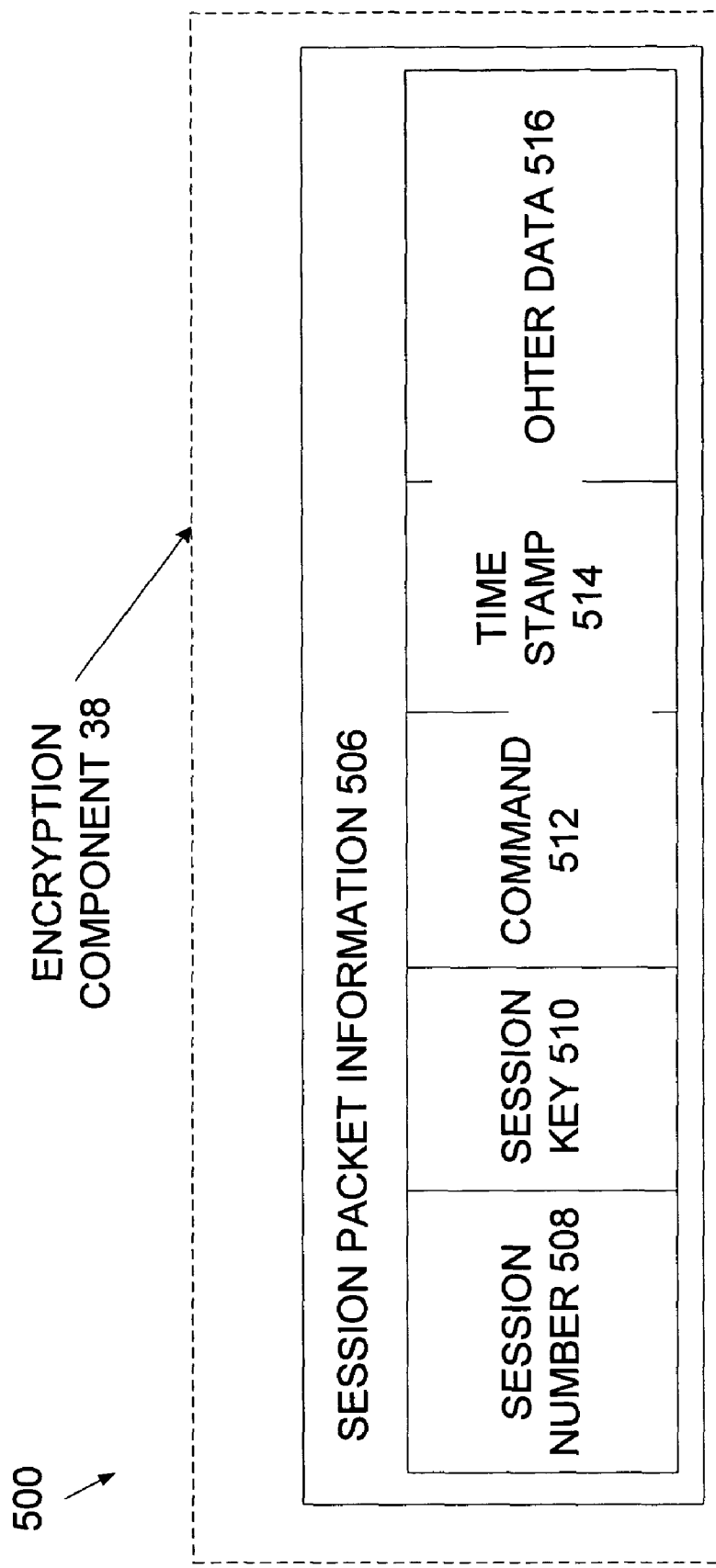
FIG. 6 is a block diagram representation of a session packet.

As a result of the steps of method 400, a session packet 500, illustrated in FIG. 6, is generated. As illustrated, session packet 500 is encrypted with encryption component 38 and is then ready to be transmitted to reader 12. Session packet 500 includes session packet information 506, which illustratively includes session number 508, session key 510 (public key), time stamp 514 and other data 516. Time stamp 514 can optionally not be included in the packet. Time stamp 514 can simply be maintained on the computer with its corresponding session number for subsequent comparison purposes.

Session number 508 is illustratively a non-sequential number that is unique to a particular session. Session key 510 (public key) can also be unique to a particular session but does not have to be. Whether or not the public key does vary, a corresponding private key should be accessible to the computer. Timestamp 514 is a time value indicative of a time associated with the session initiation. Other data 516 may also be provided with session data 506. After session packet 500 is assembled and encrypted in accordance with encryption component 38, it is transmitted to reader 12.

Figure 7:
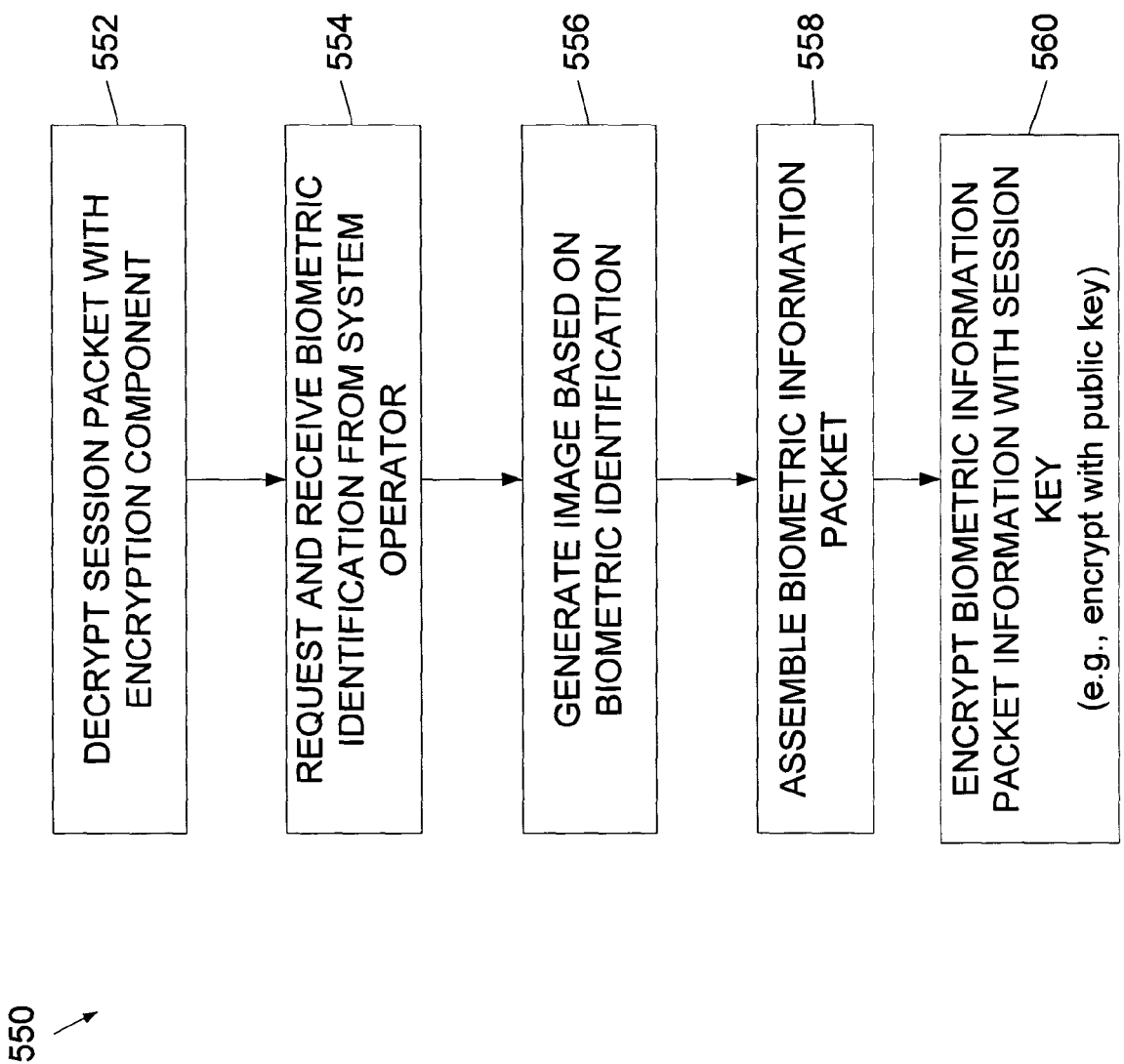
FIG. 7 is a flow diagram illustrating steps performed in association with generating a biometric information packet.

Once reader 12 receives session packet 500, reader 12 performs method 550 illustrated in FIG. 7. The method includes decrypting the session packet at step 552. This decrypting is completed using an encryption component, in particular, encryption component 34 illustrated in FIG. 3. Once the session packet is decrypted, reader 12 collects biometric identification information from a system operator (e.g., based on the command received in a session packet). In one mode of operation, the user will perform a fingerprint scan utilizing reader 12. Other types of identification may also be used. At step 556, an image is generated. At step 558, biometric information packet information is assembled. The biometric information packet information illustratively includes the session number sent in the session packet and the image generated in step 556. Once the biometric information packet information is assembled, the packet is encrypted with the session key (public key) sent in session packet 500. This is completed in step 560.

Figure 8:
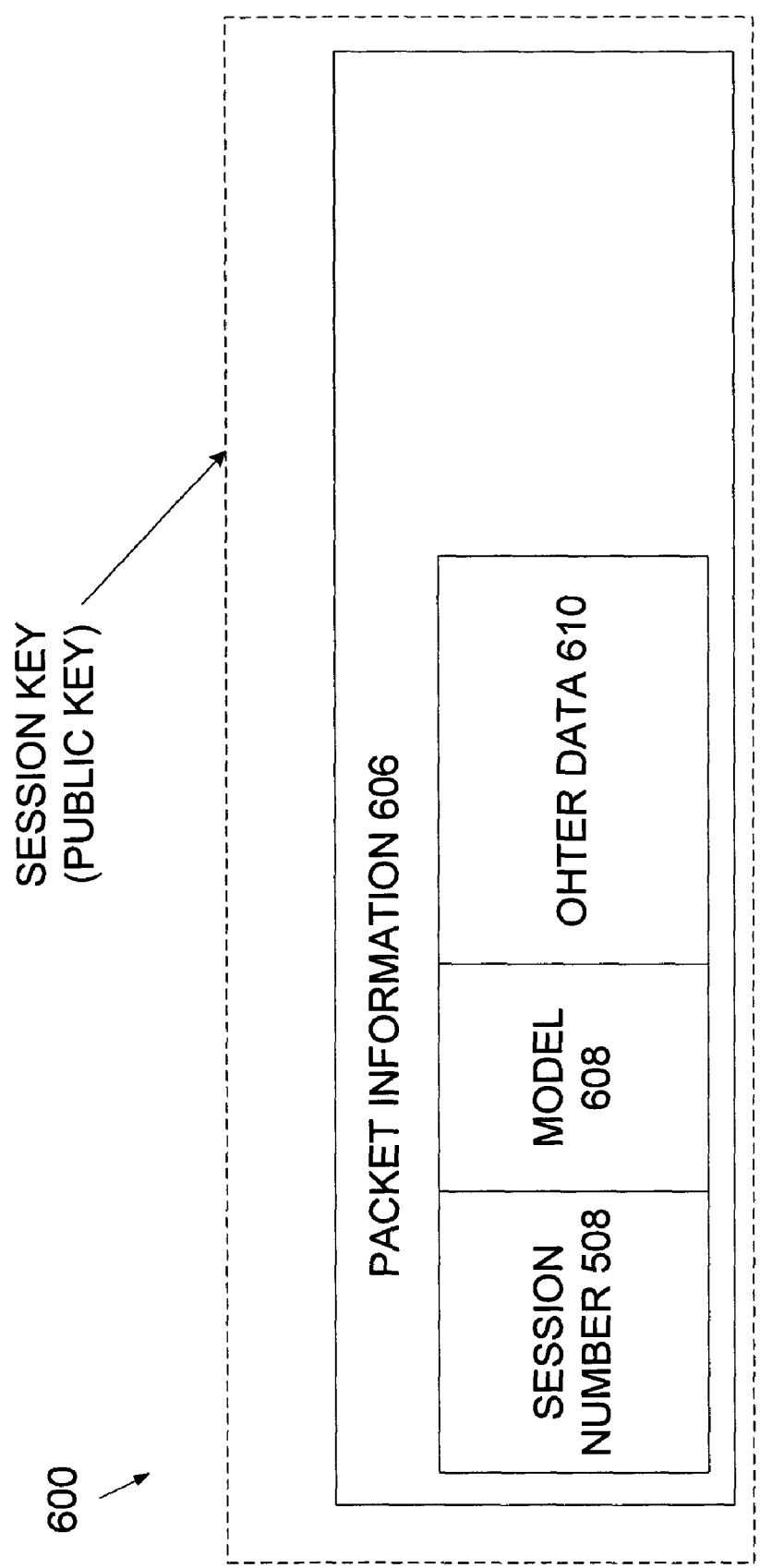
FIG. 8 is a block diagram representation of a biometric information packet.

FIG. 8 illustrates biometric information packet 600. Biometric information packet 600 is encrypted with session key (the public key) and includes packet information 606. Packet information 606 includes session number 508, authentication model 608 (or some other form of biometric information) and other data 610. The biometric information packet can also illustratively include a time stamp, such as an independently generated time stamp or time stamp 514 to assist in later determining whether the biometric information packet was received within the predetermined time period. Once biometric information packet 600 is assembled, it is transmitted to computer 32.

Figure 9:
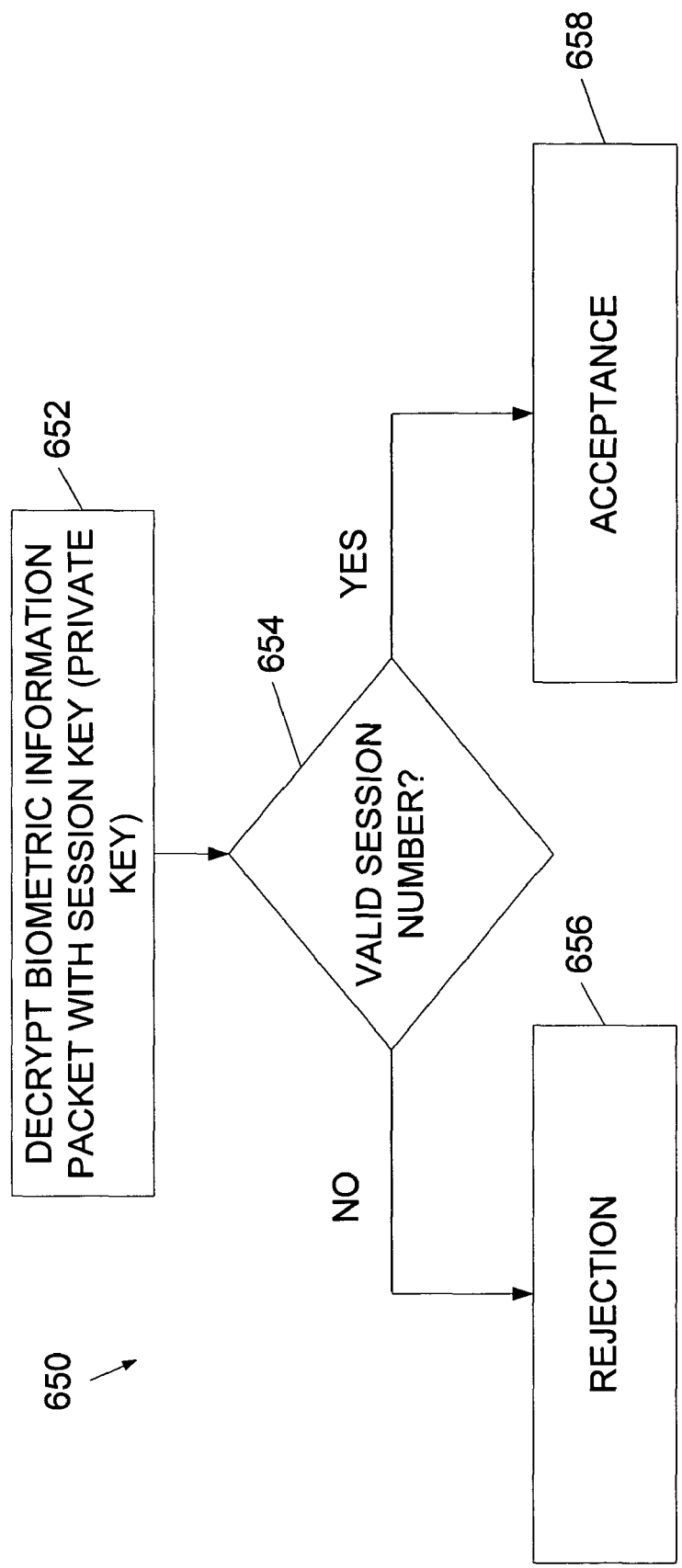
FIG. 9 is a flow diagram illustrating steps associated with processing a received biometric information packet.

Once computer 32 has received biometric information packet 600, method 650, illustrated in FIG. 9, is performed. Initially, the biometric information packet 600 is decrypted utilizing the retained session key (the private key) at step 652. Next, at step 654, the session number is validated. In order to provide enhanced security, the authorization may be declined if the session number is not valid, for example, if it does not match the retained value, or, if the biometric information packet was not received within a specified amount of time. Authorization is declined at step 656. If a valid session number is received, processing is allowed to continue at step 658. This may be performed as illustrated in FIG. 2. Again, the present invention is not limited to the authentication process. It could just as easily be applied in the context of an enrollment or some other process.

Although the present invention has been described with reference to preferred embodiments, workers skilled in the art will recognize that changes may be made in form and detail without departing from the spirit and scope of the invention.

What is claimed is:

1. A computer-implemented method for enhancing the security of informational interactions with a biometric device, comprising:

pre-establishing an encryption relationship between a computing device and the biometric device, wherein the computing device and biometric device include separate but related encryption components and the biometric device encryption component is implemented as firmware and decrypts information encrypted by the computing device encryption component;

generating a session packet, wherein generating a session packet comprises generating a session number, generating a session time stamp, obtaining a session key, and storing the session number, the session time stamp, and the session key in the session packet;

maintaining a record of the session number, the session time stamp, and the session key in a database associated with the computing device;

encrypting the session packet utilizing the computing device encryption component and transmitting it to the biometric device;

receiving a biometric information packet from the biometric device, decrypting it with an encryption key that is complimentarily related to the session key, and making a determination as to whether or not to utilize a collection of biometric data contained in the decrypted biometric information packet, wherein making a determination comprises comparing a session number received with or as part of the biometric information packet to the record of the session number and evaluating the session time stamp to determine whether the biometric information packet was received within a predetermined time period;

wherein pre-establishing, generating, maintaining, encrypting, and receiving enhance the security of informational interactions between the biometric device that collects the collection of biometric data and the computing device that selectively utilizes the collection of biometric data; and wherein the method is performed in the consecutive order of pre-establishing, generating, maintaining, encrypting, and receiving.

2. The method of claim 1, wherein obtaining a session key comprises generating a public key portion of a PKI key pair.

3. The method of claim 2, wherein receiving a biometric information packet and decrypting it comprises receiving a biometric information packet and decrypting it with a private key portion of the PKI key pair.

4. The method of claim 1, wherein making a determination further comprises comparing a data representation of a user's biometric information to at least one data representation of biometric information stored in a database.

5. The method of claim 1, wherein pre-establishing an encryption relationship comprises storing a first part of a PKI key pair with the computing device and a second part of the PKI key pair with the biometric device.

6. The method of claim 5, wherein encrypting the session packet comprises encrypting the session packet utilizing the first part of the PKI key pair.

7. The method of claim 1, wherein Pre-establishing an encryption relationship comprises storing a first part of a static encryption key pair with the computing device and a second part of the static encryption key pair with the biometric device, one of the first and second parts being configured to decrypt information that has previously been encrypted utilizing the other part.

8. The method of claim 7, wherein encrypting the session packet comprises encrypting the session packet utilizing the first part of the static encryption key pair.

9. A biometric security system comprising:

a computing device having a first encryption component, a first encryption program, a processor, and a first interface, wherein the computing devices generates a session packet that is encrypted using the first encryption component and wherein the session packet comprises a session number, a session key, a command, a time stamp, and a first set of data;

a database associated with the computing device, wherein the database stores a record of the session number, the session key, and the time stamp;

a reader having a second encryption component, a second encryption program, and a second interface, wherein the reader generates a biometric information packet based upon the command, wherein the biometric information packet is encrypted using the session key, and wherein the biometric information packet comprises the session number, a model, and a second set of data;

wherein the session packet is transmitted from the first interface to the second interface and the reader decrypts the session packet with the second encryption component;

wherein the biometric information packet is transmitted from the second interface to the first interface and the computing device decrypts the biometric information packet with an encryption key that is complimentarily related to the session key;

wherein the second encryption component is implemented as firmware and decrypts information encrypted by the first encryption component; and wherein the processor selectively utilizes the model based upon a comparison of the session number to a copy of the session number retrieved from the database and a comparison of the time stamp to a time indicative of when the biometric information packet was received by the computing device.

10. The biometric security system of claim 9 wherein the computing device generates the session packet in response to a request from the reader.

11. The biometric security system of claim 9 wherein the computing device generates the session packet in response to a request from an independent application associated with the reader.

12. The biometric security system of claim 9 wherein the computing device generates the session packet in response to a request for secured rights.

13. The biometric security system of claim 9 wherein the session key is a public key and the encryption key complimentarily related to the session key is a private key.

14. The biometric security system of claim 9 wherein the first encryption component is a first part of a PKI key pair and the second encryption component is a second part of the PKI key pair.

15. The biometric security system of claim 9 wherein the first encryption component is a first part of a static key pair and the second encryption component is a second part of a static key pair.

16. The biometric security system of claim 9 wherein the model comprises a collection of biometric information.

17. The biometric security system of claim 16 wherein the collection of biometric information is collected as part of an enrollment operation and wherein the processor selectively utilizes the model by storing a copy of the model in the database.

18. The biometric security system of claim 16 wherein the collection of biometric information is collected as part of an authorization operation and wherein the processor selectively utilizes the model to grant an access right.

19. The biometric security system of claim 18 wherein the processor selectively utilizes the model to grant an access right comprises a comparison of the model to a match template stored in the database.

20. The biometric security system of claim 9 wherein the processor performs an image qualification function on at least part of a collection of available image data and wherein the image qualification comprises determining whether the collection of available image data is fraudulent.

21. The biometric security system of claim 9 wherein the processor performs an image qualification function on at least part of a collection of available image data and wherein the image qualification comprises determining whether the collection of available image data is of sufficient quality.

22. The biometric security system of claim 9 wherein the processor performs an image qualification function on at least part of a collection of available image data and wherein the image qualification comprises determining whether the collection of available image data is fraudulent and whether the collection of available image data is of sufficient quality.

23. A computer-implement method for enhancing the security of informational interactions with a biometric device, the method comprising:
- pre-establishing an encryption relationship between the biometric device and a computing device, wherein pre-establishing comprises storing a first encryption component in the biometric device that is directly affiliated to a second encryption component stored in the computing device;
- requesting an access right associated with the computing device;
- initiating an authorization session;
- generating a session packet that includes a unique session number and a public key portion of a PKI key pair;
- retaining a copy of the session number and a private key portion of the PKI key pair;
- encrypting the session packet utilizing the second encryption component;
- transmitting the encrypted session packet that includes the session number and the public key portion of the PKI key pair to the biometric device;
- decrypting the session packet utilizing the first encryption component;
- collecting a set of biometric information from a system operator;
- generating a biometric information packet that includes the set of biometric information and the session number;
- encrypting the biometric information packet utilizing the public key portion of the PKI key pair that was transmitted to the biometric device in the encrypted session packet;
- transmitting the encrypted biometric information packet to the computing device;
- decrypting the encrypted biometric information packet utilizing the retained private key portion of the PKI key pair;
- comparing the retained copy of the session number to the session number included in the biometric packet;
- comparing a time frame to a predetermined time frame, wherein the time frame is based at least partially upon the time that the encrypted biometric packet is received by the computing device;
- utilizing the set of biometric information based upon a determination that the retained copy of the session number matches the session number included in the biometric packet and based upon a determination that the time frame is within the predetermined time frame;
- not utilizing the set of biometric information based upon a determination that the retained copy of the session number does not match the session number included in the biometric packet; and
- not utilizing the set of biometric information based upon a determination that the time frame is not within the predetermined time frame.

24. The computer-implemented method of claim 23 wherein utilizing the set of biometric data comprises transferring the set of biometric information to a processor associated with the computing device.

25. The computer-implemented method of claim 24 wherein transferring the biometric information to the processor associated with the computing device comprises transferring the biometric information to the processor for processing.

26. The computer-implemented method of claim 25 wherein processing comprises an authentication.

27. The computer-implemented method of claim 25 wherein processing comprises an enrollment.

28. The computer-implemented method of claim 23 wherein the authorization session opens upon initiation and closes after a predetermined time.

29. The computer-implemented method of claim 28 wherein the predetermined time comprises the amount of time required for the biometric device to complete a scan.

30. The computer-implemented method of claim 23 wherein the unique session number comprises a non-consecutive number that is unique to a particular session.

31. The computer-implemented method of claim 23 wherein the public key is unique to a particular session.

32. The computer-implemented method of claim 23 wherein the public key is the same for multiple sessions.

33. The computer-implemented method of claim 23 wherein collecting a set of biometric information from a system operator is based on a command received in the session packet.

34. The computer-implemented method of claim 23 wherein the first encryption component is implemented as firmware.

35. The computer-implemented method of claim 23 wherein the first encryption component is implemented as flash memory.

* * * * *